Oct. 28, 1952     M. E. PELAEZ     2,615,538
COLLAPSIBLE DERRICK
Filed July 16, 1948

INVENTOR.
Manuel Eduardo Pelaez,
BY Brown, Jackson,
Boettcher & Dienner Attys.

Patented Oct. 28, 1952

2,615,538

UNITED STATES PATENT OFFICE 2,615,538

COLLAPSIBLE DERRICK

Manuel Eduardo Pelaez, Burzaco, Argentina

Application July 16, 1948, Serial No. 39,043
In Argentina May 14, 1948

6 Claims. (Cl. 189—15)

The present invention relates to a new type derrick adapted to be applied to the frame of automotive vehicles, and particularly to load carrying vehicles, such as motor trucks and such vehicles as are designed for attendance to disabled vehicles, and on which at present is used the usual type of hoisting derricks for towing disabled vehicles to workshops or service stations. Such vehicles, on account of the mounting system of the derricks and the complicated mechanism thereof, are apt only for the exclusive purpose of serving as a towing means for other conveyances, whereby their use is limited to such purpose, namely for use as service vehicles. This in turn implies the necessity of keeping a complementary fleet of motor trucks for the transportation of cargo, requiring an investment which, by the solution brought about by the principle forming the subject-matter of the present invention, becomes unnecessary, inasmuch as a vehicle supplied with the derrick system according to this case may be used indifferently as a servicing agent or for the transportation of cargo on the vehicle frame, thereby increasing the practical value of the vehicle so equipped.

The derrick referred to by the present invention fills the purpose of obtaining a mechanism for holding disabled vehicles, by the free rearward suspension of transportation vehicles, including mechanical means, and synchronizedly actuated means for securing the derrick in raised position, the whole forming an assembly of maximum simplicity as to its structure and permitting by the mechanical actuating means the speeding up of the rigging operation in any of the actuating cycles, either for rigging the derrick into operating position or for collapsing same against the bottom of the vehicle frame.

In order that the present invention may be fully understood and readily carried into practice, the present specification has been illustrated by drawings wherein.

In all figures the same reference numbers are used to indicate equal or corresponding parts.

Figure 1:
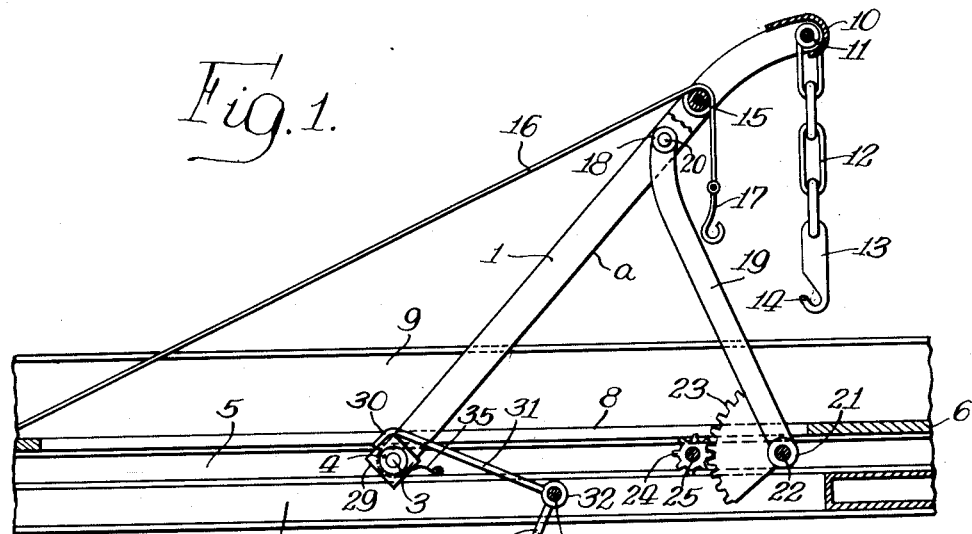
Figure 1 is a fragmentary view in section along the line A—A of Figure 2, of a vehicle frame having the derrick according to the invention applied thereto.

As shown in the accompanying drawings, the assembly comprises the following arrangement of members: A derrick comprising the jib $a$ formed by a frame constituting a lever of the third order, and formed by a pair of beams 1 disposed in spaced apart side by side relationship and having their lower or inner ends 2 rotatably receiving a shaft 3, the ends of said shaft being on wheels 4, guided in U-profile rails or channel members 5 inserted between the bottom 6 and the beams 7 forming the vehicle frame, the remaining parts whereof are not shown for greater clearness of illustration of the members integrating the derrick and the controlling mechanism thereof. The derrick $a$, in collapsed position, is disposed within an opening 8 formed in the floor, having dimensions calculated in accordance with the dimensions of the derrick, adapted to permit of raising and collapsing said derrick.

At their upper or outer ends 10, the beams 1 are provided with a hooking member 11 for a chain 12, the link placed at the end of the chain opposite that secured to the hooking member 11, being provided with a plate 13 the free end whereof forms a claw 14 adapted to hook into the fenders or any other part of the vehicle to be towed. Adjacent the end 10 of both beams 1, there is journalled therebetween a roller 15 engaged by a hoisting cable 16 with a depending hook 17, for hoisting the vehicles in order to secure them to the holding member 13 which latter keeps the vehicles in a raised position for suspension during the towing operation. The cable 16 extends to a common-type drum—not shown—used for carrying out the hoisting operation.

Figure 2:
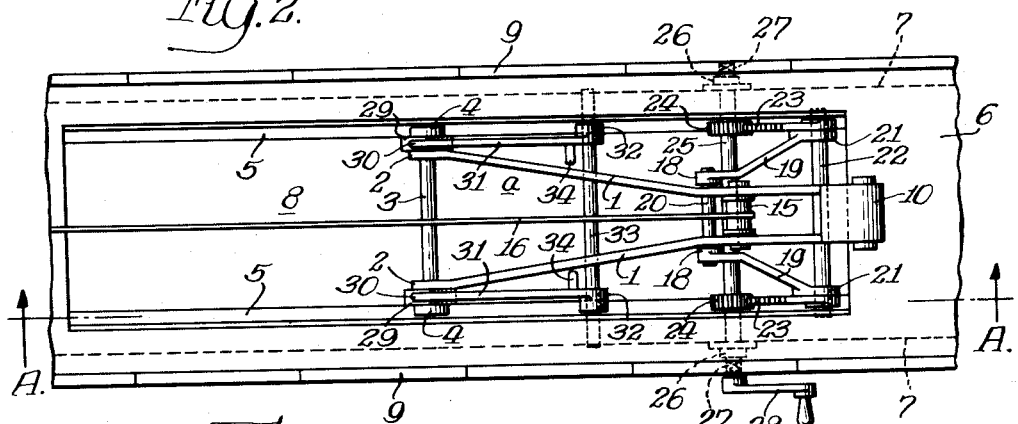
Figure 2 is a plan view of the assembly shown in Figure 1, with the members integrating the derrick and the controlling mechanism therefor.
Figure 3:
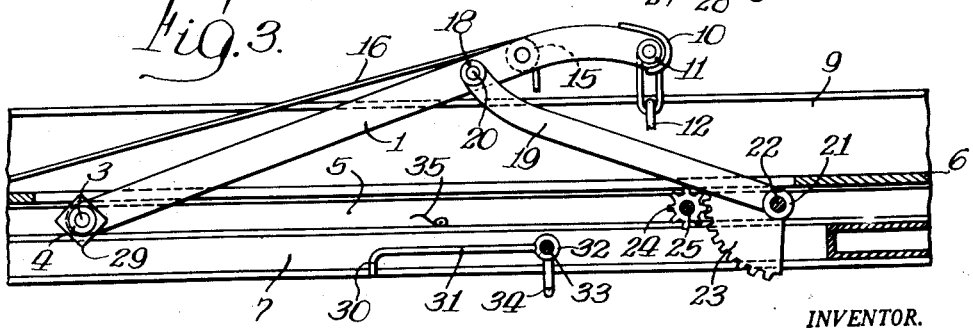
Figure 3 is a view similar to Figure 1, but showing the derrick in collapsed position.

Both beams 1 have pivoted thereto at some distance from the end 10, the end portions 18 of connecting rods 19 by means of a shaft 20. Said connecting rods constitute the supporting and actuating means for the jib $a$ and at their ends 21 are pivotally engaged by a common shaft 22 fixed to the lateral portions of the channel members 5. Said connecting rods are provided at their ends pivoted on shaft 22, with a toothed sector 23 in coacting engagement with a respective actuating pinion 24, there being two toothed sectors 23, one integral with each rod 19, as well as two actuating pinions 24 mounted in turn on a common shaft 25, suitably journalled at the side portions of the main frame structure of the vehicle by means of bearings, both ends of said shaft 25 projecting from the sides of the frame through bushings 26, see Fig. 2, said projecting end portions having each a prismatic end 27, adapted for coupling thereto a detachable crank 28 for actuating said shaft in order to adjust the jib $a$ through mediation of said connecting rods 19.

The shaft 3 which has the ends 2 of both beams 1 engaged therewith (which beams constitute the jib $a$), carries fastened to said ends 2 a pair of sliding blocks 29, located in the reach of two catches 30, formed by the curved ends of blocking bars 31 ending in a boss 32, both bosses being mounted on the ends of a common shaft 33, journalled on the side members of the vehicle main frame. Each of the bosses 32 is provided with an arm 34 for carrying the catcher bars to a raised position in which the sliding blocks 29 become freely movable when it is desired to fold the jib against the opening 8 of the floor 6. The sliding blocks 29 are provided with pawls 35 for automatically imparting the initial lifting motion to the catcher bars 31.

From what has been described hereinbefore and disclosed in the accompanying drawings, it is easy to gather which is the functional performance of the derrick in the operative lifting cycle thereof for effecting the hooking-up of the disabled vehicles for the purpose of transportation thereof by towage towards the mechanical workshop or service station. When the jib is folded down against the floor, the actuating crank 28 is rotated, thereby imparting lifting motion to the connecting rods causing the jib to be slidingly shifted, the beams 1 of said jib, by means of the rollers 4, shifting along the rails 5, and on reaching the position of contact of the pawls 35 with the catcher bars 31, they will impart thereto an initial upward motion whereby, when the jib arrives at its uppermost position, the catches 30 will automatically hook over the sliding blocks and thus firmly anchor the jib in the uplifted position where it may be used for the hoisting operations in connection with a disabled vehicle by means of the hoisting cable 16, with the aid of the hook 17 and the final hooking up with the member 13.

When the derrick is to be collapsed, the vehicle being towed is taken off the holding member 13 and placed in a normal position upon the ground, by loosening the hoisting cable 16 until the derrick is freed from the weight of the vehicle. Then the catcher-bars 31 are raised by means of the control arm 34 to bring catches 30 out of engagement with blocks 29. When this is done, the derrick, due to gravity, will automatically collapse towards the recess 8. This results in a sudden collapse of the derrick which is resorted to, however, only in case the folding operation is desired to be made in a hurry, it being also possible, while one operator unhooks the catcher bars, for another operator to actuate the crank 28, thereby gradually carrying the derrick to the folded position in which the jib will lie flat against the bottom of the recess 8. The recess 8 is thereafter covered with planks forming a continuation of the floor 6, whereby the vehicle will be in a condition for carrying any kind of cargo.

From the matter described in this specification and disclosed in the accompanying drawings, the advantages inherent to the assembly referred to by the present invention are to be clearly seen, it being unnecessary to enter into further details with regard thereto, excepting the fact that the inventor's right is to be clearly established as regards the introduction of modifications in detail in the assembly forming the derrick and the controlling members thereof, without departing from the limits and scope of the appended claims.

Having now particularly ascertained and described the nature of my present invention and the manner in which the same is to be carried into practice, I hereby declare that what I claim to be of my exclusive property and invention, is:

1. A collapsible derrick for vehicles having a main frame, comprising a pair of spaced apart channel members supported by said main frame, a jib positioned between said channel members, means connecting one end of said jib with said channel members for rotational and sliding movement with respect thereto in the raising and lowering of the jib, means pivotally connected to both the channel members and the other end of said jib to support the latter in its raised position, actuating means connected with said last named means for raising and lowering the jib, and releasable self-locking means between said vehicle main frame and said jib to anchor the latter in its raised position.

2. A collapsible derrick as specified in claim 1, wherein the means connecting one end of said jib with said channel members for rotational and sliding movement with respect thereto in the raising and lowering of the jib, comprises a transverse shaft journaled in one end of the jib, and wheels fixed to the ends of the shaft for movement in the channel members.

3. A collapsible derrick as specified in claim 1, wherein the jib comprises a pair of laterally spaced apart beam members disposed in side by side relationship, and wherein the means connecting one end of said jib with said channel members for rotational and sliding movement with respect thereto in the raising and lowering of the jib comprises a transverse shaft journaled in the beam members, and wheels fixed to the ends of the shaft for movement in the channel members.

4. A collapsible derrick as specified in claim 1, wherein the means for supporting the jib in its raised position comprises a pair of rods having one end pivotally secured to the jib adjacent the upper end thereof, and a transverse shaft fixed to said channel members and rotatably receiving the other ends of said rods.

5. A collapsible derrick as specified in claim 1, wherein the means for supporting the jib in its raised position comprises a pair of rods having one end pivotally secured to the jib adjacent the upper end thereof, and a transverse shaft fixed to said channel members and rotatably receiving the other ends of said rods, and wherein the actuating means comprises a sector gear fixed to each of said rods and a pinion meshing with each of said sector gears and fixed to a transverse shaft journaled in the main frame of the vehicle.

6. A collapsible derrick as specified in claim 1, wherein the means connecting one end of said jib with said channel members for rotational and sliding movement with respect thereto in the raising and lowering of the jib, comprises a transverse shaft journaled in one end of the jib, and wheels fixed to the ends of the shaft for movement in the channel members, and wherein the releasable self-locking means comprises a pair of blocking bars curved at one end and fixed at their other end to a transverse shaft rotatably journaled in the vehicle main frame, and a block secured to the end of said jib and adjacent the transverse shaft journaled therein for cooperating with the curved ends of said blocking bars to anchor the jib in its raised position.

MANUEL EDUARDO PELAEZ.

REFERENCES CITED

The following references are of record in the file of this patent:

UNITED STATES PATENTS

| Number | Name | Date |
|---|---|---|
| 1,640,672 | Schauman | Aug. 30, 1927 |
| 2,145,378 | Trippensee | Jan. 31, 1939 |
| 2,283,443 | Klein | May 19, 1942 |